United States Patent
Yamane

(10) Patent No.: US 11,480,396 B2
(45) Date of Patent: Oct. 25, 2022

(54) TOTAL HEAT EXCHANGE ELEMENT PAPER AND TOTAL HEAT EXCHANGE ELEMENT

(71) Applicant: MITSUBISHI PAPER MILLS LIMITED, Tokyo (JP)

(72) Inventor: Kengo Yamane, Tokyo (JP)

(73) Assignee: MITSUBISHI PAPER MILLS LIMITED, Tokyo (JP)

(*) Notice: Subject to any disclaimer, the term of this patent is extended or adjusted under 35 U.S.C. 154(b) by 346 days.

(21) Appl. No.: 16/640,413

(22) PCT Filed: Aug. 20, 2018

(86) PCT No.: PCT/JP2018/030674
§ 371 (c)(1),
(2) Date: Feb. 20, 2020

(87) PCT Pub. No.: WO2019/039434
PCT Pub. Date: Feb. 28, 2019

(65) Prior Publication Data
US 2020/0363141 A1 Nov. 19, 2020

(30) Foreign Application Priority Data

Aug. 23, 2017 (JP) .............................. JP2017-160178
Jul. 23, 2018 (JP) .............................. JP2018-137909

(51) Int. Cl.
| | | |
|---|---|---|
| *D21H 19/72* | (2006.01) | |
| *F28D 21/00* | (2006.01) | |
| *D21H 19/38* | (2006.01) | |
| *D21H 21/22* | (2006.01) | |
| *F24F 3/147* | (2006.01) | |

(52) U.S. Cl.
CPC ....... *F28D 21/0015* (2013.01); *D21H 19/385* (2013.01); *D21H 19/72* (2013.01); *D21H 21/22* (2013.01); *F24F 3/147* (2013.01)

(58) Field of Classification Search
CPC ........ D21H 27/00; D21H 21/22; D21H 17/68; D21H 19/40; D21H 17/66; D21H 17/73; D21H 19/385; D21H 21/14; D21H 19/72; D21H 17/63; F28F 21/00; F28F 3/147; F28D 21/0015; F28D 21/0014
USPC ........................................................ 162/181.6
See application file for complete search history.

(56) References Cited

U.S. PATENT DOCUMENTS

| | | |
|---|---|---|
| 4,574,872 A | 3/1986 | Yano et al. |
| 5,753,345 A | 5/1998 | Kuma et al. |

FOREIGN PATENT DOCUMENTS

| | | |
|---|---|---|
| EP | 2 071 267 | 6/2009 |
| EP | 2 138 792 | 12/2009 |
| JP | 55-140097 | 11/1980 |
| JP | 56-30595 | 3/1981 |
| JP | 59-112194 | 6/1984 |
| JP | 8-299745 | 11/1996 |
| JP | 2001-141384 | 5/2001 |
| JP | 2015-059286 | 3/2015 |

OTHER PUBLICATIONS

Matsuoka et al., JP 2015-059286 A, 2015, machine translation.*
International Search Report dated Oct. 23, 2018 in International (PCT) Application No. PCT/JP2018/030674.
Extended European Search Report dated Feb. 26, 2021 in corresponding European Patent Application No. 18848796.1.

* cited by examiner

*Primary Examiner* — Mark Halpern
(74) *Attorney, Agent, or Firm* — Wenderoth, Lind & Ponack, L.L.P.

(57) ABSTRACT

Total heat exchange element paper having excellent moisture resistance and gas barrier properties, comprising a substrate sheet and a moisture absorbent and colloidal silica both of which are adhered to the substrate sheet, wherein the substrate sheet contains natural pulp which has been beaten to a freeness specified in JIS P 8121-1:2012 of not lower than 80° SR and the colloidal silica is cationic colloidal silica.

16 Claims, No Drawings

TOTAL HEAT EXCHANGE ELEMENT PAPER AND TOTAL HEAT EXCHANGE ELEMENT

This application is a 371 of PCT/JP2018/030674 filed 20 Aug. 2018

TECHNICAL FIELD

The present invention relates to total heat exchange element paper for use in a total heat exchange element for keeping a comfortable space in buildings, offices, stores and houses. More specifically, it relates to total heat exchange element paper for use in a total heat exchange element which is mounted to a total heat exchanger for supplying fresh outside air into a room and discharging dirty inside air so as to carry out sensible heat (temperature) exchange and latent heat (humidity) exchange at the same time.

BACKGROUND ART

As ventilation means having excellent heating/cooling efficiency in indoor air-conditioning, there is well known total heat exchange that carries out temperature (sensible heat) exchange and humidity (latent heat) exchange at the same time between a supply air flow for supplying fresh outside air and an exhaust air flow for discharging dirty inside air.

In a total heat exchange element for carrying out total heat exchange, a supply air flow and an exhaust air flow are formed in independent channels with total heat exchange element paper therebetween, and total heat exchange is carried out between them. Therefore, when indoor ventilation is carried out with a total heat exchanger having this total heat exchange element, it is possible to greatly improve heating/cooling efficiency.

Along with the spread of a total heat exchanger, the total heat exchanger is being installed at various places and in various environments. There is no problem when a temperature difference and a humidity difference between a supply air flow and an exhaust air flow are small. However, for example, in an environment where condensation occurs as in a cold region having a low outside air temperature and an environment where a temperature difference and a humidity difference between a supply air flow and an exhaust air flow are large as in a bath room having a high indoor humidity, at the time of carrying out total heat exchange, total heat exchange element paper may be exposed to high humidity. When this state continues, the total heat exchange element paper cannot hold a large amount of water and so-called "water dripping" that water is dripped from the total heat exchange element paper may occur. When water dripping occurs, a metal outer frame used as a reinforcement is rusted according to the type of a moisture absorbent. When water dripping continues, the total heat exchange element deforms. In either case, the total heat exchanger does not function at all.

While conventional total heat exchange element paper has both thermal transferability and moisture permeability, it has the permeability of a dirty gas component such as carbon dioxide as it is made from a porous material. Therefore, it has a disadvantage that ventilation efficiency lowers due to the mixing of a supply air flow and an exhaust air flow in the element at the time of total heat exchange. The mixing of a supply air flow and an exhaust air flow is a fatal defect for a total heat exchanger. A total heat exchanger in which a supply air flow and an exhaust air flow are mixed together may be evaluated such that inside air and outside air are not exchanged while they are collected by energy and dirty inside air is merely circulated. Even when thermal transferability and moisture permeability are high, if inside air and outside air are mixed together, the total heat exchanger does not achieve the purpose of ventilation and does not function at all.

For this reason, total heat exchange element paper which has excellent moisture resistance without the occurrence of water dripping and excellent gas barrier properties without the mixing of a supply air flow and an exhaust air flow is desired. To meet this, there is disclosed a heat exchanger in which air flow paths in first and second elements are exchanged periodically by turning a columnar heat exchanger formed by alternately laminating together the first and second elements in a circumferential direction (Patent Document 1). However, even when the paths were exchanged periodically, moisture resistance and gas barrier properties could not be improved regardless of the moisture resistance and gas barrier properties of the total heat exchange element paper itself. There is also disclosed total heat exchange element paper which contains metal copper or copper alloy (Patent Document 2). Although the growth of mold was suppressed to a certain degree by containing metal copper or copper alloy, moisture resistance and gas barrier properties could not be improved. There is further disclosed total heat exchange element paper in which a substrate sheet is coated with a moisture absorbent and gas permeability, moisture permeability and the ratio of orientation strength in a vertical direction to orientation strength in a horizontal direction fall within certain ranges (Patent Document 3). However, water dripping occurred at a high humidity as the total heat exchange element paper could not hold water and gas barrier properties were not improved.

Further, there is disclosed a total heat exchanger including a moisture-permeable gas-barrier material produced by containing a chemical comprising a surface treatment agent in a fibrous porous member (Patent Documents 4 and 5). Patent Document 4 discloses a total heat exchanger characterized in that two different air flows to be totally heat exchanged are partitioned by using a moisture-permeable gas-barrier material produced by impregnating or coating a polymer material containing at least a moisture absorbent out of a moisture absorbent and flame retardant into or on a fibrous porous member produced by mixing white carbon and cellulose fibers. Patent Document 5 discloses a total heat exchanger characterized in that two different air flows to be totally heat exchanged are partitioned by using a moisture-permeable gas-barrier material produced by containing a chemical comprising a surface treatment agent in a fine porous member and teaches colloidal alumina and colloidal silica having a particle diameter of 0.01 to 0.1 μm as the surface treatment agent. However, even when the porous member containing a chemical disclosed by Patent Documents 4 and 5 is used, there is room for the great improvement of flame retardancy, especially gas barrier properties. Since the chemical comprising a surface treatment agent is dispersed in the moisture-permeable gas-barrier material in the porous members of Patent Documents 4 and 5, there is room for the improvement of moisture resistance as well.

PRIOR ART DOCUMENTS

Patent Documents

Patent Document 1: JP-A 59-112194
Patent Document 2: JP-A 2001-141384

Patent Document 3: JP-A 2015-59286
Patent Document 4: JP-A 55-140097
Patent Document 5: JP-A 56-30595

DISCLOSURE OF THE INVENTION

Problem to be Solved by the Invention

It is an object of the present invention to provide total heat exchange element paper for constituting an element for total heat exchangers, which has such high moisture resistance that water dripping does not occur even at a high humidity and such high gas barrier properties that the mixing of a supply air flow and an exhaust air flow does not occur.

Other objects and advantages of the present invention will become apparent from the following description.

Means for Solving the Problems

The above objects and advantages of the present invention can be attained by the following means.
(1) Total heat exchange element paper comprising a substrate sheet and a moisture absorbent and colloidal silica both of which are adhered to the substrate sheet.
(2) The total heat exchange element paper in the above paragraph (1), wherein the substrate sheet contains natural pulp which has been beaten to a freeness specified in JIS P 8121-1:2012 of not lower than 80° SR.
(3) The total heat exchange element paper in the above paragraph (1) or (2), wherein the colloidal silica is cationic colloidal silica.
(4) The total heat exchange element paper in any one of the above paragraphs (1) to (3), wherein the percentage of colloidal silica to the moisture absorbent is 1 to 40 mass %.
(5) The total heat exchange element paper in any one of the above paragraphs (1) to (4), wherein, when the total heat exchange element paper is divided into three layers having the same thickness in a thickness direction, the ratio (Si/C ratio) of intensity peak values of Si and C measured by energy dispersive X-ray spectroscopy in each layer of upper and lower layers is 1.5 times or more that of an intermediate layer.
(6) A total heat exchange element formed by using the total heat exchange element paper in any one of the paragraphs (1) to (5).

Effect of the Invention

The total heat exchange element paper of the present invention has effects such high moisture resistance that water dripping does not occur even at a high humidity and such high gas barrier properties that the mixing of a supply air flow and an exhaust air flow does not occur.

BEST MODE FOR CARRYING OUT THE INVENTION

A detailed description is subsequently given of the total heat exchange element paper of the present invention.

The total heat exchange element paper of the present invention is characterized in that it comprises a substrate sheet and a moisture absorbent and colloidal silica both of which are adhered to the substrate sheet. The substrate sheet is preferably a sheet containing natural pulp which has been beaten to a freeness specified in JIS P 8121-1:2012 of not lower than 80° SR. The colloidal silica is more preferably cationic colloidal silica.

A description is subsequently given of the substrate sheet in the total heat exchange element paper of the present invention. The substrate sheet in the present invention is preferably a sheet produced from natural pulp by a wet system. Examples of the natural pulp include wood pulp fibers such as hardwood bleached kraft pulp (LBKP), softwood bleached kraft pulp (NBKP), hardwood bleached sulfite pulp (LBSP), softwood bleached sulfite pulp (NBSP), softwood unbleached kraft pulp (NUKP) and hardwood unbleached kraft pulp (LUKP). These wood pulp fibers are preferably used alone or in combination. As other raw materials, vegetable fibers such as cotton, cotton linter, linen, bamboo, sugar cane, Indian corn and kenaf; animal fibers such as wool and silk; and cellulose regenerated fibers such as rayon, cupra and Lyocell may be used alone or in combination.

As the natural pulp, natural pulp which has been beaten to a freeness specified in JIS P 8121-1:2012 of not lower than 80° SR is preferably used. Since a substrate sheet containing fine natural pulp having a freeness of not lower than 80° SR forms a dense structure while retaining affinity for water, moisture permeability and gas barrier properties can be obtained, colloidal silica adhered to the substrate sheet by coating or impregnation is hardly incorporated into the inside of the substrate sheet, and most thereof stays on the surface layer of the substrate sheet with the result that moisture resistance is greatly improved.

The substrate sheet may contain various compounding agents such as filler exemplified by heavy calcium carbonate, light calcium carbonate, kaolin, talc, clay, titanium dioxide, aluminum hydroxide, silica, alumina and organic pigment, adhesive, sizing agent, fixer, retention aid and paper strength additive to obtain required density, smoothness, air permeability and strength.

To manufacture the substrate sheet, natural pulp is formed into a sheet by using an ordinary Fourdrinier paper machine or cylinder paper machine.

The substrate sheet may be surface-size pressed with a size press or roll coater mounted to a paper machine so as to obtain required density, smoothness, air permeability and strength. As the components of a surface size press solution, starch prepared by purifying a natural plant, hydroxyethyl starch, oxidized starch, etherified starch, starch phosphate, enzyme-modified starch or cool water-soluble starch obtained by flash drying them, and a synthetic binder such as polyvinyl alcohol may be used.

The substrate sheet may be calendered to obtain required density, smoothness, air permeability and strength. A calendar apparatus having at least one pair of rolls selected from the group consisting of a pair of hard rolls, a pair of elastic rolls and a pair of a hard roll and an elastic roll is preferably used. Stated more specifically, a machine calendar, soft nip calendar, super calendar, multi-stage calendar and multi-nip calendar may be used.

Although the weight, thickness and density of the substrate sheet are not particularly limited, from the viewpoint of exchange efficiency, a substrate sheet having a low weight, small thickness and high density is preferred. The weight is preferably 20 to 80 g/m$^2$, more preferably 30 to 50 g/m$^2$. The thickness is preferably 20 to 80 μm, more preferably 30 to 50 μm. The density is preferably 0.8 to 1.1 g/cm$^3$, more preferably 0.9 to 1.1 g/cm$^3$.

A flame retardant may be adhered to the substrate sheet to provide flame retardancy. As the flame retardant, inorganic flame retardants, inorganic phosphorus-based compounds, nitrogen-containing compounds, chlorine-based compounds and bromine-based compounds may be used. Examples of the flame retardant include flame retardants which are soluble or dispersible in water such as a mixture of borax and boric acid, aluminum hydroxide, antimony trioxide, ammonium phosphate, ammonium polyphosphate, ammonium sulfamate, guanidine sulfamate, guanidine phosphate, phosphoric amide, chlorinated polyolefin, ammonium bromide and non-ether type polybromo cyclic compound. The level of flame retardancy is preferably such that char length measured by JIS A 1322:1966 is smaller than 10 cm. The deposition amount of the flame retardant is not particularly limited and differs according to a flame retardant in use but preferably 5 to 10 $g/m^2$. Although the flame retardant may be adhered in an amount of more than 10 $g/m^2$, its effect levels off.

A mildew-proofing agent may be adhered to the substrate sheet so as to provide mildew resistance. As the mildew-proofing agent, commercially available mildew-proofing agents may be used. Examples of the mildew-proofing agent include organic nitrogen compounds, sulfur-based compounds, organic acid esters, organic iodine-based imidazole compounds and benzazole compounds. The level of mildew resistance is preferably such that the growth of mycelium measured by JIS Z 2911:2010 is not observed. The deposition amount of the mildew-proofing agent is preferably 0.5 to 5 $g/m^2$. Although the mildew-proofing agent may be adhered in an amount of more than 5 $g/m^2$, its effect levels off.

A description is subsequently given of the moisture absorbent to be adhered to the total heat exchange element paper of the present invention. The moisture absorbent is coated on or impregnated into the substrate sheet to enhance wet heat exchange efficiency. Examples of the moisture absorbent include inorganic acid salts, organic acid salts, inorganic fillers, polyhydric alcohols, urea's and moisture (water) absorbing polymers.

The inorganic acid salts include lithium chloride, calcium chloride and magnesium chloride. The organic acid salts include sodium lactate, calcium lactate and sodium pyrrolidone carboxylate. The inorganic fillers include aluminum hydroxide, calcium carbonate, aluminum silicate, magnesium silicate, talc, clay, zeolite, diatomaceous earth, sepiolite, silica gel and activated carbon. The polyhydric alcohols include glycerin, ethylene glycol, triethylene glycol and polyglycerin. The urea's include urea and hydroxyethyl urea.

The moisture (water) absorbing polymers include polyaspartic acid, polyacrylic acid, polyglutamic acid, polylysin, alginic acid, carboxymethyl cellulose, hydroxyalkyl cellulose and salts or crosslinked products thereof, carrageenan, pectin, gellan gum, agar, xanthane gum, hyaluronic acid, guar gum, gum arabic, starch and crosslinked products thereof, polyethylene glycol, polypropylene glycol, collagen, acrylonitrile-based polymer saponified product, starch/acrylic acid salt graft copolymer, vinyl acetate/acrylic acid salt copolymer saponified product, starch/acrylonitrile graft copolymer, acrylic acid salt/acrylamide copolymer, polyvinyl alcohol/maleic anhydride copolymer, polyethylene oxide-based, isobutylene-maleic anhydride copolymer and polysaccharide/acrylic acid salt graft self-crosslinked product. The type and deposition amount of the moisture absorbent are selected and used according to target moisture permeability.

In the present invention, at least one moisture absorbent selected from the group consisting of calcium chloride, lithium chloride and magnesium chloride is preferably used from the viewpoints of cost and moisture permeability. The particularly preferred moisture absorbent is calcium chloride. Calcium chloride may be used in combination with another moisture absorbent.

The deposition amount of the moisture absorbent is not particularly limited. Moisture permeability which differs according to the type of the moisture absorbent in use is preferably not lower than 300 $g/m^2 \cdot 24$ h when measured at a temperature of 23° C. and a relative humidity of 50% by using an evaluation method specified in JIS Z 0208:1976. Within this range, a total heat exchange element having excellent wet heat exchange performance can be obtained. The deposition amount of the moisture absorbent which differs according to the type of the moisture absorbent in use is preferably 3 to 15 $g/m^2$, more preferably 4 to 10 $g/m^2$ as wet heat exchange performance levels off from a certain deposition amount. Moisture permeability is preferably 300 to 1,500 $g/m^2 \cdot 24$ h, more preferably 400 to 1,000 $g/m^2 \cdot 24$ h.

A description is subsequently given of the colloidal silica in the total heat exchange element paper of the present invention. The colloidal silica used in the present invention is called "sol-method silica" and prepared by dispersing in water into a colloidal form silicon dioxide obtained by heat-aging silica sol obtained by double decomposition with an acid such as sodium silicate or through an ion exchange resin layer. For example, colloidal silica described in JP-A 60-219083, JP-A 61-19389, JP-A 61-188183, JP-A 63-178074 and JP-A 5-51470 may be used. Although the reason that moisture resistance is improved by adhering the colloidal silica is unknown yet, it is assumed that one of the reasons is the change of the wettability of the surface of the total heat exchange element paper. In the case of total heat exchange element paper without the colloidal silica adhered thereto, the wet-spreading of water adhered to the surface is very fast, whereby water dripping occurs in a short time. Meanwhile, in the case of total heat exchange element paper to which the colloidal silica has been adhered, the colloidal silica existent on the surface layer prevents this wet-spreading. Another reason is the water retention capability of the colloidal silica itself. Water adhered to the surface is held by the colloidal silica, thereby suppressing water dripping. That is, it is assumed that moisture resistance is improved by these two effects.

The surface of the colloidal silica can be treated with a surfactant or inorganic salt to improve dispersibility in water in the production process. According to this treating method, colloidal silicas are roughly divided into cationic colloidal silica and anionic colloidal silica.

Out of these, cationic colloidal silica is preferably used as the colloidal silica. Since the preferred substrate sheet contains natural pulp in the present invention, when the colloidal silica is coated on or impregnated into the substrate sheet, an electric repulsion function occurs, whereby the colloidal silica is hardly incorporated into the substrate sheet and mostly stays on the surface layer of the substrate sheet. Thereby, the effect of further improving moisture resistance is obtained.

In the present invention, as the cationic colloidal silica, colloidal silica whose surface has been coated with a modifier such as metal oxide hydrate and charged cationic is used. As the metal oxide hydrate, aluminum oxide hydrate, zinc oxide hydrate and zirconium oxide hydrate are used. A modifier composed of aluminum oxide hydrate is preferably used as it is especially stable and facilitates a modification treatment.

In the total heat exchange element paper of the present invention, the deposition amount of the colloidal silica is not particularly limited. To attain the object of improving moisture resistance, the percentage of the colloidal silica to the moisture absorbent is preferably 1 to 40 mass %, more preferably 5 to 40 mass %. When the percentage is lower than 1 mass %, moisture resistance deteriorates and water dripping may occur. Even when the percentage is higher than 40 mass %, the effect of improving moisture resistance is the same as that when the percentage is 40 mass %. Therefore, it is uneconomical and "powder falling" that the colloidal silica falls off from the total heat exchange element paper may occur disadvantageously.

The average particle diameter of the colloidal silica is not particularly limited but preferably 1 to 120 nm, more preferably 1 to 100 nm, much more preferably 10 to 50 nm. The average particle diameter can be obtained as number median diameter by using a laser scattering type particle size distribution meter (for example, LA910 of Horiba Ltd.) when primary particles agglomerate to form secondary agglomerates. When secondary particles are not formed, the average particle diameter can be obtained as the average particle diameter of 100 particles existent in a certain area from an electron microphotograph of particles which are dispersed to such an extent that the primary particle diameter can be discriminated. Also, the average particle diameter can be obtained as a conversion value from a specific surface measurement value (in accordance with JIS Z8830: 2013) by a BET adsorption method.

The colloidal silica products having various average particle diameters have already been commercially available and may be used in the present invention. Examples thereof include the Snowtex (registered trademark) series of Nissan Chemical Corporation, the SILICADOL (registered trademark) series of Nippon Chemical Industrial, Co., Ltd., the PL series of Fuso Chemical Co., Ltd., the Adelite (registered trademark) AT series of ADEKA Corporation, the LUDOX (registered trademark) series of W. R. GRACE (the U.S.), the NYACOL (registered trademark) series of NANO TECHNOLOGIES (the U.S.), and the Kleboso (registered trademark) series of Merck KGaA(DE). Out of these, the Snowtex AK-XS, AK, AK-L, AK-YL and AK-PS-S of Nissan Chemical Corporation and LUDOX CL and CL-P of W.R. GRACE (the U.S.) are used as the cationic colloidal silica.

When the total heat exchange element paper is divided into three layers having the same thickness in the thickness direction, the percentage of the colloidal silica in each layer is obtained from the Si/C ratio which is the intensity peak value ratio of silicon Si to carbon C by energy dispersive X-ray spectroscopy. In the present invention, when the total heat exchange element paper is divided into three layers in the thickness direction, the Si/C ratio in each layer of the upper and lower layers is preferably 1.5 times or more the Si/C ratio in the intermediate layer. "The Si/C ratio in each layer of the upper and lower layers to the Si/C ratio in the intermediate layer" may be simply referred to as "upper or lower/intermediate ratio". When the upper or lower/intermediate ratio is 1.5 times or more, though the total weight is the same, the percentage of the colloidal silica in the upper or lower layer becomes high, which is more effective in improving moisture resistance. The upper or lower/intermediate ratio is more preferably 5 times or more, much more preferably 10 times or more. Although the upper limit of the upper or lower/intermediate ratio is not particularly limited, according to studies in the present invention, it is about 20 times.

The energy dispersive X-ray spectroscopy (to be abbreviated as "EDS" hereinafter) is an element analyzing technique in which an electron beam is applied to the surface of a sample to detect X-rays characteristic of atoms generated at that time with an energy dispersion type detector so as to find elements constituting the surface of the sample and concentrations thereof from the energies and intensities of X-rays. An example of the analyzing device using this energy dispersive X-ray spectroscopy is an electric field emission-type scanning electron microscope (JSM-06700F of JEOL Ltd.). As for the Si/C ratio in the present invention, each of the three layers having the same thickness obtained by dividing the total heat exchange element paper in the thickness direction equally was measured on the cross section of the total heat exchange element paper at an acceleration voltage of 20 kV and a magnification of 800× by using the JSM-06700F. The Si/C ratio was obtained from the ratio of characteristic X-ray peak intensities (count number of characteristic X-rays) derived from Si and C in each of the obtained layers.

As the method of adjusting the upper and lower/intermediate ratio to the numeral range of the present invention, for example, a dense sheet obtained by promoting the beating of pulp should be used as the substrate sheet. Cationic colloidal silica or colloidal silica having a large particle diameter should be used as the colloidal silica. Although the coating method is not particularly limited if the above requirements are satisfied, for example, when a nip coater is used, the upper and lower/intermediate ratio can be adjusted by changing the nip pressure.

The method of adhering the moisture absorbent and the colloidal silica to the substrate sheet is not particularly limited if these components can be adhered to the substrate sheet as uniformly as possible. They may be adhered separately or a mixture of them may be adhered. There may be employed a method in which a solution or dispersion containing the moisture absorbent and the colloidal silica is applied to the substrate sheet by coating, impregnation or spraying and a solvent or a dispersion medium is removed by drying to adhere the moisture absorbent and the colloidal silica to the substrate sheet.

EXAMPLES

The following examples are provided for the purpose of further illustrating the present invention but are in no way to be taken as limiting. "%" and "parts" in examples mean "mass %" and "parts by mass", respectively, unless otherwise noted.

Example 1

After softwood bleached kraft pulp (NBKP) was disintegrated to a concentration of 3%, it was beaten with a double disk refiner and a deluxe finer until the freeness specified in JIS P 8121-1:2012 of the pulp became 80° SR. Thereafter, a substrate sheet for total heat exchange element paper having a weight of 30 g/m$^2$ was formed from the pulp by a Fourdrinier paper machine. Then, 8 g/m$^2$ of calcium chloride as a moisture absorbent and 10 mass % (0.8 g/m$^2$) based on the moisture absorbent of the Snowtex (registered trademark) AK cationic colloidal silica (manufactured by Nissan Chemical Corporation, average particle diameter (catalog value) of 10 to 15 nm) as colloidal silica were impregnated with a nip coater at a rate of 60 m/min and a nip pressure of 3.5 kgf/cm$^2$ and dried to obtain total heat exchange element paper. The upper and lower/intermediate ratio of the obtained total heat exchange element paper was 1.1.

Example 2

Total heat exchange element paper was obtained in the same manner as in Example 1 except that the freeness specified in JIS P 8121-1:2012 of the pulp was changed to 70° SR.

Example 3

Total heat exchange element paper was obtained in the same manner as in Example 1 except that the freeness specified in JIS P 8121-1:2012 of the pulp was changed to 90° SR.

Example 4

Total heat exchange element paper was obtained in the same manner as in Example 1 except that the freeness specified in JIS P 8121-1:2012 of the pulp was changed to 70° SR and the Snowtex (registered trademark) C anionic colloidal silica (manufactured by Nissan Chemical Corporation, average particle diameter (catalog value) of 10 to 15 nm) was used as colloidal silica.

Example 5

Total heat exchange element paper was obtained in the same manner as in Example 1 except that the Snowtex (registered trademark) C anionic colloidal silica (manufactured by Nissan Chemical Corporation) was used as colloidal silica.

Example 6

Total heat exchange element paper was obtained in the same manner as in Example 1 except that the freeness specified in JIS P 8121-1:2012 of the pulp was changed to 90° SR and the Snowtex (registered trademark) C anionic colloidal silica (manufactured by Nissan Chemical Corporation) was used as colloidal silica.

Comparative Example 1

Total heat exchange element paper was obtained in the same manner as in Example 1 except that colloidal silica was not added.

Comparative Example 2

Total heat exchange element paper was obtained in the same manner as in Example 1 except that Alumina Sol 520-A (manufactured by Nissan Chemical Corporation) was used in place of colloidal silica.

The total heat exchange element papers of Examples 1 to 6 and Comparative Examples 1 and 2 were evaluated by the following methods, and the evaluation results are shown in Table 1.

{Method of Evaluating Moisture Resistance}

To evaluate moisture resistance, a total heat exchange element having a length of 200 mm, a width of 200 mm, a height of 250 mm and a one-step height of 4 mm was manufactured by using total heat exchange element paper. At this time, 70 g/m² bleached kraft paper was used as a spacer. This total heat exchange element was left at a temperature of 30° C. and a relative humidity of 90% for 48 hours to evaluate the existence of water dripping and the shape change of the element visually. The evaluation criteria are given below.

⊚: excellent without water dripping and shape change
○: satisfactory with little water dripping and little shape change
Δ: permissible with some water drippings and some shape changes
X: cannot be used due to water dripping and shape change

[Method of Evaluating Gas Barrier Properties (Leakage of Carbon Dioxide)]

A total heat exchange element which was identical to the total heat exchange element manufactured for the evaluation of moisture resistance was used, and a synthetic air gas containing nitrogen and oxygen in a ratio of 79:21 was let pass through the element from the air supply side of total heat exchange element and a dirty gas containing carbon dioxide in a certain concentration was let pass through the element from the exhaust side to carry out ventilation. The concentration of carbon dioxide at the outlet on the air supply side was measured and compared with the concentration of carbon dioxide at the inlet on the exhaust side to calculate the percentage of leakage of carbon dioxide. The evaluation criteria are given below.

The evaluation method and criteria are the same as in Examples 7 to 14.

⊚: carbon dioxide leakage of less than 0.1%
○: carbon dioxide leakage of not less than 0.1% to less than 1%
Δ: carbon dioxide leakage of not less than 1% to less than 5%
X: carbon dioxide leakage of not less than 5%

TABLE 1

| | Freeness of pulp (° SR) | Type of moisture absorbent | Deposition amount of moisture absorbent (g/m²) | Type of colloidal silica | Percentage of colloidal silica to moisture absorbent (mass %) | Moisture resistance | Gas barrier properties |
|---|---|---|---|---|---|---|---|
| Example 1 | 80 | Calcium chloride | 8 | Cationic | 10 | ○ | ○ |
| Example 2 | 70 | Calcium chloride | 8 | Cationic | 10 | ○ | Δ |
| Example 3 | 90 | Calcium chloride | 8 | Cationic | 10 | ⊚ | ⊚ |
| Example 4 | 70 | Calcium chloride | 8 | Anionic | 10 | Δ | Δ |
| Example 5 | 80 | Calcium chloride | 8 | Anionic | 10 | Δ | ○ |
| Example 6 | 90 | Calcium chloride | 8 | Anionic | 10 | ○ | ⊚ |

TABLE 1-continued

| | Freeness of pulp (° SR) | Type of moisture absorbent | Deposition amount of moisture absorbent (g/m²) | Type of colloidal silica | Percentage of colloidal silica to moisture absorbent (mass %) | Moisture resistance | Gas barrier properties |
|---|---|---|---|---|---|---|---|
| C. Ex. 1 | 80 | Calcium chloride | 8 | None | — | X | Δ |
| C. Ex. 2 | 80 | Cacium chloride | 8 | Alumina sol | 10 | X | ○ |

C. Ex.: Comparative Example

It is understood from comparison between Examples 1 to 6 and Comparative Examples 1 and 2 that total heat exchange element paper comprising a substrate sheet and a moisture absorbent and colloidal silica both of which are adhered to the substrate sheet is excellent in moisture resistance and gas barrier properties. It is understood from comparison between Examples 1 to 3 and Examples 4 to 6 that as the freeness value specified in JIS P 8121-1:2012 of natural pulp becomes larger, the gas barrier properties become more excellent and that the freeness is preferably not lower than 80° SR. It is also understood from comparison between Example 1 and Example 5, comparison between Example 2 and Example 4 and comparison between Example 3 and Example 6 that moisture resistance is improved by using cationic colloidal silica. In Comparative Example 1 which is total heat exchange element paper to which colloidal silica was not adhered and in Comparative Example 2 which is total heat exchange element paper comprising alumina sol and not colloidal silica, moisture resistance was not obtained.

Example 7

Total heat exchange element paper was obtained in the same manner as in Example 5 except that 4 g/m² of lithium chloride was impregnated as a moisture absorbent and 10 mass % (0.4 g/m²) based on the moisture absorbent of anionic colloidal silica was impregnated.

Example 8

Total heat exchange element paper was obtained in the same manner as in Example 1 except that 4 g/m² of lithium chloride was impregnated as a moisture absorbent and 10 mass % (0.4 g/m²) based on the moisture absorbent of cationic colloidal silica was impregnated.

Example 9

Total heat exchange element paper was obtained in the same manner as in Example 5 except that 8 g/m² of magnesium chloride was impregnated as a moisture absorbent.

Example 10

Total heat exchange element paper was obtained in the same manner as in Example 1 except that 8 g/m² of magnesium chloride was impregnated as a moisture absorbent.

TABLE 2

| | Freeness of pulp (° SR) | Type of moisture absorbent | Deposition amount of moisture absorbent (g/m²) | Type of colloidal silica | Percentage of colloidal silica to moisture absorbent (mass %) | Moisture resistance | Gas barrier properties |
|---|---|---|---|---|---|---|---|
| Example 7 | 80 | Lithium chloride | 4 | Anionic | 10 | Δ | ○ |
| Example 8 | 80 | Lithium chloride | 4 | Cationic | 10 | ○ | ○ |
| Example 9 | 80 | Magnesium chloride | 8 | Anionic | 10 | Δ | ○ |
| Example 10 | 80 | Magnesium chloride | 8 | Cationic | 10 | ○ | ○ |

TABLE 2

| | Freeness of pulp (° SR) | Type of moisture absorbent | Deposition amount of moisture absorbent (g/m²) | Type of colloidal silica | Percentage of colloidal silica to moisture absorbent (mass %) | Moisture resistance | Gas barrier properties |
|---|---|---|---|---|---|---|---|
| Example 7 | 80 | Lithium chloride | 4 | Anionic | 10 | Δ | ○ |

TABLE 2-continued

| | Freeness of pulp (° SR) | Type of moisture absorbent | Deposition amount of moisture absorbent (g/m$^2$) | Type of colloidal silica | Percentage of colloidal silica to moisture absorbent (mass %) | Moisture resistance | Gas barrier properties |
|---|---|---|---|---|---|---|---|
| Example 8 | 80 | Lithium chloride | 4 | Cationic | 10 | ○ | ○ |
| Example 9 | 80 | Magnesium chloride | 8 | Anionic | 10 | Δ | ○ |
| Example 10 | 80 | Magnesium chloride | 8 | Cationic | 10 | ○ | ○ |

It is understood from Examples 7 to 10 that total heat exchange element paper comprising a substrate sheet and a moisture absorbent and colloidal silica both of which are adhered to the substrate sheet is excellent in moisture resistance and gas barrier properties regardless of the type of the moisture absorbent.

Example 11

Total heat exchange element paper was obtained in the same manner as in Example 1 except that 1 mass % (0.08 g/m$^2$) based on a moisture absorbent of colloidal silica was impregnated.

Example 12

Total heat exchange element paper was obtained in the same manner as in Example 1 except that 40 mass % (3.2 g/m$^2$) based on a moisture absorbent of colloidal silica was impregnated.

It is understood from Examples 1, 11 and 12 that total heat exchange element paper having a higher percentage of colloidal silica than a moisture absorbent has more excellent moisture resistance.

Example 13

Total heat exchange element paper was obtained in the same manner as in Example 1 except that the nip pressure of a nip coater was set to 2.0 kgf/cm$^2$. The upper and lower/intermediate ratio was 1.5.

Example 14

Total heat exchange element paper was obtained in the same manner as in Example 1 except that the nip pressure of a nip coater was set to 0.5 kgf/cm$^2$. The upper and lower/intermediate ratio was 10.0.

TABLE 3

| | Freeness of pulp (° SR) | Type of moisture absorbent | Deposition amount of moisture absorbent (g/m$^2$) | Type of colloidal silica | Percentage of colloidal silica to moisture absorbent (mass %) | Moisture resistance | Gas barrier properties |
|---|---|---|---|---|---|---|---|
| Example 11 | 80 | Calcium chloride | 8 | Cationic | 1 | Δ | ○ |
| Example 12 | 80 | Calcium chloride | 8 | Cationic | 40 | ◉ | ○ |

TABLE 3

| | Freeness of pulp (° SR) | Type of moisture absorbent | Deposition amount of moisture absorbent (g/m$^2$) | Type of colloidal silica | Percentage of colloidal silica to moisture absorbent (mass %) | Moisture resistance | Gas barrier properties |
|---|---|---|---|---|---|---|---|
| Example 11 | 80 | Calcium chloride | 8 | Cationic | 1 | Δ | ○ |
| Example 12 | 80 | Calcium chloride | 8 | Cationic | 40 | ◉ | ○ |

TABLE 4

| | Freeness of Pulp (° SR) | Type of moisture absorbent | Deposition amount of moisture absorbent (g/m²) | Type of colloidal silica | Percentage of Colloidal silica to moisture absorbent (mass %) | Nip pressure of attached roll (kgf/cm²) | upper and lower/ intermediate ratio | Moisture resistance | Gas barrier properties |
|---|---|---|---|---|---|---|---|---|---|
| Example 1 | 80 | Calcium chloride | 8 | Cationic | 10 | 3.5 | 1.1 | ○ | ○ |
| Example 13 | 80 | Calcium chloride | 8 | Cationic | 10 | 2.0 | 1.5 | ⊚ | ○ |
| Example 14 | 80 | Calcium chloride | 8 | Cationic | 10 | 0.5 | 10.0 | ⊚ | ○ |

It is understood from Examples 1, 13 and 14 that total heat exchange element paper having a higher upper and lower/intermediate ratio is more excellent in moisture resistance though the deposition amount of colloidal silica is the same.

INDUSTRIAL APPLICABILITY

The total heat exchange element paper of the present invention is used in the total heat exchange element of a total heat exchanger which carries out temperature (sensible heat) exchange and humidity (latent heat) exchange when it supplies fresh air and discharges dirt inside air.

The invention claimed is:

1. A total heat exchange element paper comprising a substrate sheet and a moisture absorbent and colloidal silica both of which are adhered to the substrate sheet,
    wherein the total heat exchange element paper includes three layers having the same thickness in a thickness direction, the ratio (Si/C ratio) of intensity peak values of silicon Si and carbon C measured by energy dispersive X-ray spectroscopy in each layer of upper and lower layers is 1.5 times or more that of an intermediate layer.

2. A total heat exchange element formed by using the total heat exchange element paper of claim 1.

3. A total heat exchange element paper comprising a substrate sheet and a moisture absorbent and colloidal silica both of which are adhered to the substrate sheet,
    wherein the substrate sheet contains natural pulp which has been beaten to a freeness specified in JIS P 8121-1:2012 of not lower than 80° SR, and
    wherein the total heat exchange element paper includes three layers having the same thickness in a thickness direction, the ratio (Si/C ratio) of intensity peak values of silicon Si and carbon C measured by energy dispersive X-ray spectroscopy in each layer of upper and lower layers is 1.5 times or more that of an intermediate layer.

4. A total heat exchange element formed by using the total heat exchange element paper of claim 3.

5. A total heat exchange element paper comprising a substrate sheet and a moisture absorbent and colloidal silica both of which are adhered to the substrate sheet,
    wherein the colloidal silica is cationic colloidal silica, and
    wherein the total heat exchange element paper includes three layers having the same thickness in a thickness direction, the ratio (Si/C ratio) of intensity peak values of silicon Si and carbon C measured by energy dispersive X-ray spectroscopy in each layer of upper and lower layers is 1.5 times or more that of an intermediate layer.

6. A total heat exchange element formed by using the total heat exchange element paper of claim 5.

7. A total heat exchange element paper comprising a substrate sheet and a moisture absorbent and colloidal silica both of which are adhered to the substrate sheet,
    wherein a percentage of the colloidal silica to the moisture absorbent is 1 to 40 mass %, and
    wherein the total heat exchange element paper includes three layers having the same thickness in a thickness direction, the ratio (Si/C ratio) of intensity peak values of silicon Si and carbon C measured by energy dispersive X-ray spectroscopy in each layer of upper and lower layers is 1.5 times or more that of an intermediate layer.

8. A total heat exchange element formed by using the total heat exchange element paper of claim 7.

9. A total heat exchange element paper comprising a substrate sheet and a moisture absorbent and colloidal silica both of which are adhered to the substrate sheet,
    wherein the substrate sheet contains natural pulp which has been beaten to a freeness specified in JIS P 8121-1:2012 of not lower than 80° SR,
    wherein the colloidal silica is cationic colloidal silica, and
    wherein the total heat exchange element paper includes three layers having the same thickness in a thickness direction, the ratio (Si/C ratio) of intensity peak values of silicon Si and carbon C measured by energy dispersive X-ray spectroscopy in each layer of upper and lower layers is 1.5 times or more that of an intermediate layer.

10. A total heat exchange element formed by using the total heat exchange element paper of claim 9.

11. A total heat exchange element paper comprising a substrate sheet and a moisture absorbent and colloidal silica both of which are adhered to the substrate sheet,
    wherein the substrate sheet contains natural pulp which has been beaten to a freeness specified in JIS P 8121-1:2012 of not lower than 80° SR,
    wherein a percentage of the colloidal silica to the moisture absorbent is 1 to 40 mass %, and
    wherein the total heat exchange element paper includes three layers having the same thickness in a thickness direction, the ratio (Si/C ratio) of intensity peak values of silicon Si and carbon C measured by energy dispersive X-ray spectroscopy in each layer of upper and lower layers is 1.5 times or more that of an intermediate layer.

12. A total heat exchange element formed by using the total heat exchange element paper of claim 1.

13. A total heat exchange element paper comprising a substrate sheet and a moisture absorbent and colloidal silica both of which are adhered to the substrate sheet, wherein the colloidal silica is cationic colloidal silica, wherein a percentage of the colloidal silica to the moisture absorbent is 1 to 40 mass %, and wherein the total heat exchange element paper includes three layers having the same thickness in a thickness direction, the ratio (Si/C ratio) of intensity peak values of silicon Si and carbon C measured by energy dispersive X-ray spectroscopy in each layer of upper and lower layers is 1.5 times or more that of an intermediate layer.

14. A total heat exchange element formed by using the total heat exchange element paper of claim 13.

15. A total heat exchange element paper comprising a substrate sheet and a moisture absorbent and colloidal silica both of which are adhered to the substrate sheet, wherein the substrate sheet contains natural pulp which has been beaten to a freeness specified in JIS P 8121-1:2012 of not lower than 80° SR, wherein the colloidal silica is cationic colloidal silica, wherein a percentage of the colloidal silica to the moisture absorbent is 1 to 40 mass %, and wherein the total heat exchange element paper includes three layers having the same thickness in a thickness direction, the ratio (Si/C ratio) of intensity peak values of silicon Si and carbon C measured by energy dispersive X-ray spectroscopy in each layer of upper and lower layers is 1.5 times or more that of an intermediate layer.

16. A total heat exchange element formed by using the total heat exchange element paper of claim 15.

\* \* \* \* \*